United States Patent Office 3,233,000
Patented Feb. 1, 1966

3,233,000
PROCESS FOR THE PREPARATION OF CARBENE ADDUCTS
Robert Neville Haszeldine, Disley, and William Idris Bevan, Bristol, England, assignors to National Research Development Corporation, London, England, a British corporation
No Drawing. Filed June 1, 1962, Ser. No. 199,268
Claims priority, application Great Britain, June 9, 1961, 20,939/61
10 Claims. (Cl. 260—648)

This invention relates to the preparation of carbenes.
Carbenes are compounds having a carbon atom with a lone pair of electrons and are useful as chemical intermediates in organic syntheses. For example dichlorocarbene $C\ddot{C}l_2$ reacts with olefins to produce dichlorocyclopropane derivatives.

A known route for the preparation of, for example, dichlorocarbene is that of the base-catalysed decomposition of chloroform which proceeds as follows:

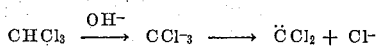

This method is usually satisfactory but cannot be employed (a) if the dichlorocarbene is to be reacted with base-sensitive chemicals e.g. base-sensitive olefins to give cyclopropanes, or with inorganic covalent hydrolysable halides such as $PCl_3$, $BCl_3$, $AsCl_3$, $SO_2Cl_2$ and (b) for a reaction requiring a gas-phase process e.g. reaction with volatile or readily-polymerisable olefins or dienes such as ethylene.

According to the invention there is provided a purely thermal process, not requiring the use of solvent or of basic media, for the preparation of a carbene of formula $R\ddot{C}R'$, where R represents H, F, Cl, alkyl or substituted alkyl e.g. haloalkyl and R' represents H, F or Cl which comprises pyrolysing an α-haloalkyltrihalosilane of formula

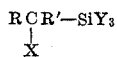

where R and R' have the above-mentioned significance and X and Y represent F or Cl and may be the same or different.

The reaction is believed to proceed according to the following scheme

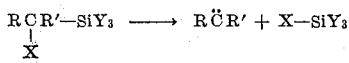

A suitable temperature range for the pyrolysis is between 100° and 500° C. In static pyrolyses, as for example, in an autoclave where pressures of the order of 10 atmospheres or more may be used and in which the reaction is predominantly in the liquid phase, a preferred temperature range is that of 100° to 300° C. In flow systems which are at sub-atmospheric pressures the preferred temperature range is that of 200° C. to 400° C.

Preferably the symbol Y represents fluorine for in such cases the pyrolysis may be effected at lower temperatures than with the corresponding chloro compounds, conveniently in the range 50°–350° C. and preferably at 100° C.–250° for static pyrolyses, and also completely in the gas phase if required.

The carbene produced in accordance with the invention may be used for further reactions, such as for example by addition across the double bond of a suitable olefin to form a cyclopropane derivative, or by reaction with inorganic halides e.g. $PCl_3$ to give $CRR'ClPCl_2$ with $BCl_3$ to give $CRR'Cl.BCl_2$. In general, the carbene so produced undergoes most of the reactions shown by $CH_2$ produced by other routes e.g. from diazomethane.

The method of the invention therefore is useful in the preparation of unusual and otherwise difficult to prepare cyclopropane derivatives. Thus, for example, the pyrolysis of the α-haloalkyl trihalosilane in the presence of an excess of the olefins ethylene or cyclohexene gives high yields of the corresponding cyclopropane derivatives according to the reactions

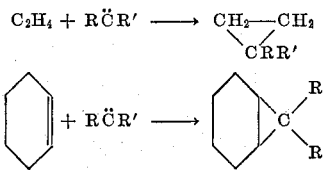

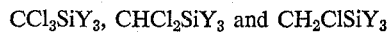

The invention also includes, therefore, a process for producing a cyclo-propane derivative in which a carbene is prepared as described above and is reacted in situ with an olefin.

Pyrolysis of the polychloromethyl-trihalosilanes $$CCl_3SiY_3,\ CHCl_2SiY_3\ \text{and}\ CH_2ClSiY_3$$

using the process of the invention produces the carbenes $C\ddot{C}l_2$, $C\ddot{H}Cl$ and $C\ddot{H}_2$ respectively and this is a particularly preferred aspect of the invention since these carbenes are difficult or impossible to prepare by other routes. Thus $CH_2$ can be prepared from diazomethane but this is an explosive and toxic chemical which cannot be used on a large scale. $C\ddot{C}l_2$ has not hitherto been prepared by a gas-phase reaction under neutral conditions.

When insert solvents are desired for the preparation and further reactions of the carbenes, those which may be used are hydrocarbons, amyl ethers and chlorocarbons.

The process of this invention may be carried out in neutral or non-acidic media or in the gas-phase. The use of $CCl_3SiF_3$ as a starting material is particularly advantageous for the production of dichlorocarbene since, in view of its low volatility, the reaction may be carried out entirely in the vapour phase and with exceptionally high yield. It is a new compound and is prepared as follows.
Trichloromethyltrichlorosilane (25.4 gms., 0.1 mole), antimony trifluoride (36 gms., 0.2 mole), and a trace of antimony pentachloride are warmed until reaction begins. When reaction has ceased the liquid and gaseous products are condensed into a high-vacuum apparatus and purified by trap-to-trap distillation through baths at −23°, −72°, −130°, and −196°. Trichloromethyltrifluorosilane is collected at −72° as a colourless liquid (6.0 gms., 30%) (Found: C, 6.1%; M, 205. $CCl_3F_3Si$ requires C, 5.9%; M, 204), B.P. 43.5°.

The invention will now be further described by the following detailed examples.

*Example 1*

Preparation of 7:7 dichlorobicyclo [4.1.0] heptane (also known as 7:7 dichloronorcarane).

Trichloromethyltrichlorosilane (14.5 gms. 56.2 mmols) and cyclohexene (22.8 gms. 278 mmols) were pyrolysed at 250°–260° C. in a stainless steel 300 ml. autoclave for ten hrs. with continuous shaking. The products were distilled under reduced pressure to give a 60% yield of 7:7 dichlorobicyclo [4.1.0] heptane (5.6 gms. 33.9 mmols) B.P. 78–79°/15 mm. This was confirmed by elemental analysis and comparison of the infra-red spectrum with that of a known sample of 7:7 dichlorobicyclo [4.1.0] heptane. (Found: C, 51.8; H, 6.1; Cl, 41.9. $C_7H_{10}Cl_2$ requires C, 50.9; H, 6.1; Cl, 43.0).

*Example 2*

Reaction between trichloromethyltrifluorosilane and cyclohexene.

Trichloromethyltrifluorosilane (2.411 gms., 0.0118 mole) and cyclohexene (5.82 gms., 0.071 mole) were heated for 24 hrs. at 140° in a 2350 ml. glass bulb. Liquid products were analysed by gas-liquid chromatography (2 m. Silicone "MS 550" at 204°) and infra-red spectroscopy and shown to contain cyclohexene and 7,7-dichloronorcarane (1.74 gms., 89%).

*Example 3*

Reaction between trichloromethyltrifluorosilane and isobutylene.

Trichloromethyltrifluorosilane (2.418 gms., 0.0119 mole) and isobutylene (3.99 gms., 0.0713 mole) entirely in the gas-phase, were heated for 24 hours at 140° in a 2350 ml. glass bulb. Analysis of the liquid products by gas-liquid chromatography (2 m. Silicone "MS 550" at 146°) and infra-red spectroscopy showed them to contain 1,1-dimethyl-2,2-dichlorocyclopropane (1.61 gms., 98%). The pure adduct was obtained by distillation in vacuo (Found: C, 43.0%; H, 5.7%. $C_5H_8Cl_2$ requires C, 43.2%; H, 5.8%).

*Example 4*

Reaction between trichloromethyltrifluorosilane and ethylene.

Trichloromethyltrifluorosilane (2.084 gms., 0.0103 mole) and ethylene (1.72 gms., 0.0615 mole) entirely in the gas-phase, were heated for 24 hours at 140° in a 2350 ml. glass bulb. Analysis of the liquid products by gas-liquid chromatography (2 m. Silicone "MS 550" at 146°) and infra-red spectroscopy showed them to contain 1,1-dichlorocyclopropane (0.79 gms., 70%). The pure adduct was obtained by distillation in vacuo (Found: C, 32.2%; H, 3.8%. $C_3H_4Cl_2$ requires C, 32.4%; H, 3.6%).

*Example 5*

The preparation of 1-fluoro-1-fluoromethyl-2,2-dimethylcyclopropane.

1,1,2 - trifluoroethyltrifluorosilane (0.58 gm., 3.4 mmoles) and isobutene (1.9 gms., 34 mmoles) were heated at 140° C., in a 250 ml. Dreadnought tube for three hours. The products were distilled to yield the cyclopropane

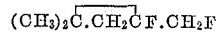

(0.32 gm., 2.7 mmoles; 79% yield). (Found: C, 60.1%; H, 8.1%; $C_6H_{10}F_2$ requires: C, 60.0%; H, 8.3%). Gas-liquid chromatography showed the presence of one component and infra-red spectroscopy showed the absence of unsaturated linkages. The compound is characterised by strong bands in its infra-red spectrum at 3.4µ, 6.8µ, 8.55µ, 9.6µ and 9.8µ.

In a manner similar to that described in the foregoing examples pyrolysis of $CHCl_2SiCl_3$ and of $CHCl_2SiF_3$ yields CHCl in good yield, and this can be trapped by reaction with an olefin such as cyclohexene or isobutylene.

The conditions used for the pyrolysis of $CCl_3SiCl_3$ are applied to the pyrolysis of $CH_2ClSiCl_3$, and the carbene $CH_2$, then formed, is trapped by formation of norcarane by reaction with cyclohexene and by formation of cyclopropyl derivatives with ethylene and alkyl-substituted ethylenes. Pyrolysis of $CH_2ClSiF_3$ is particularly useful for the gas-phase preparation of $CH_2$ under non-acidic conditions.

We claim:

1. Process for preparing a cyclopropane derivative which comprises reacting an α-halomethyltrihalosilane of formula

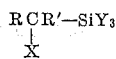

wherein R is selected from the group consisting of H, F, Cl and halo substituted alkyl and R' is selected from the group consisting of H, F and Cl and each of X and Y is selected from the group consisting of F and Cl with an olefin at a temperature between 50 and 500° C., said temperature being at least 100° C. when Y is Cl.

2. Process according to claim 1 in which the olefin is selected from the group consisting of cyclohexene, isobutene and ethylene.

3. Process according to claim 1 in which Y represents Cl and the pyrolysis is conducted at a temperature from 100° to 300° C. in a static system.

4. Process according to claim 3 in which the pyrolysis is conducted at a temperature from 200° to 400° C. in a flow system at subatmospheric pressures.

5. Process according to claim 1 in which the α-halomethyltrihalosilane is trichloromethyl-trichlorosilane.

6. Process according to claim 1 in which Y represents F and the reaction is conducted at 50° to 350° C.

7. Process according to claim 6, in which the reaction is conducted at 100° to 250° C. in a static system.

8. The process of claim 6 in which the α-halomethyltrihalosilane is trichloromethyl-trifluorosilane.

9. Process according to claim 1 in which the reaction is conducted in an inert solvent selected from the group consisting of hydrocarbons, aryl ethers and chlorocarbons.

10. Process according to claim 1 in which the pyrolysis is conducted in the vapour phase.

References Cited by the Examiner

UNITED STATES PATENTS

| | | | |
|---|---|---|---|
| 2,496,419 | 2/1950 | Sommer | 260—666 |
| 2,929,830 | 3/1960 | Kunowski | 260—448.2 |
| 2,950,328 | 8/1960 | Orchin | 260—648 |
| 2,963,516 | 12/1960 | Shackelford et al. | 260—648 |
| 2,981,746 | 4/1961 | Cohen et al. | 260—448.2 |

OTHER REFERENCES

Doering et al., "J. Am. Chem. Soc.," vol. 80, pp. 5274–77 (1958).

LEON ZITVER, *Primary Examiner.*